United States Patent [19]
Isozaki

[11] Patent Number: 5,845,127
[45] Date of Patent: Dec. 1, 1998

[54] LANGUAGE PROCESSOR AND LANGUAGE PROCESSING METHOD TO GENERATE OBJECT PROGRAMS BY COMPILING SOURCE PROGRAMS

[75] Inventor: Hiroko Isozaki, Tokyo, Japan

[73] Assignee: NEC Corporation, Tokyo, Japan

[21] Appl. No.: 680,029

[22] Filed: Jul. 15, 1996

[30] Foreign Application Priority Data

Jul. 15, 1995 [JP] Japan .................................. 7-201781

[51] Int. Cl.$^6$ ........................................................ G06F 9/45
[52] U.S. Cl. ................................................................ 395/708
[58] Field of Search .............................................. 395/708

[56] References Cited

U.S. PATENT DOCUMENTS

| | | | |
|---|---|---|---|
| 4,586,160 | 4/1986 | Amano et al. | 704/8 |
| 4,989,145 | 1/1991 | Kyushima | 704/9 |
| 5,428,792 | 6/1995 | Conner et al. | 395/708 |
| 5,590,331 | 12/1996 | Lewis et al. | 395/708 |

FOREIGN PATENT DOCUMENTS

| | | | |
|---|---|---|---|
| 3-184126 | 8/1991 | Japan | G06F 9/45 |
| 4-311227 | 11/1992 | Japan | G06F 9/45 |
| 7-105013 | 4/1995 | Japan | G06F 9/45 |
| 9-34725 | 1/1997 | Japan | G06F 9/45 |

OTHER PUBLICATIONS

"NEC 78K/IV Series 16–Bit Single–Chip Microcomputer—Instructions IEU–844B", (Feb. 1995, NEC Corp.), pp. i–iii, 15 and 322.
"NEC 0078K4 Series—Language EEU–961", (Mar. 1994, NEC Corp.), p. 268 and 269.

*Primary Examiner*—Emanuel Todd Voeltz
*Assistant Examiner*—John Q. Chavis
*Attorney, Agent, or Firm*—Foley & Lardner

[57] ABSTRACT

A language processor for source program compiling and object file generation provided with a function call counter section to count the number of calls for each function during syntax analysis, a function data storage section to store the call count for each function counted by the function call counter section and the code size of each code for each function generated according to the source program analysis results and a specific space function designation section which refers to the call count and the code size for each function stored in said function data storage section and designates the functions to be placed in the specific area held by the microcomputer in the program space so that the total sum of the function code sizes does not become larger than the size of the specific area with placing priority to the functions with many calls.

13 Claims, 13 Drawing Sheets

| NUMBER | 1 | 2 | 3 | 4 | 5 | 6 | 7 | 8 |
|---|---|---|---|---|---|---|---|---|
| FUNCTION SIZE (UNIT: BYTE) | 10 | 10 | 20 | 40 | 60 | 70 | 90 | 95 |
| CALL COUNT (UNIT: NUMBER OF CALLS) | 4 | 5 | 6 | 7 | 10 | 11 | 5 | 3 |

| NUMBER | 1' | 2' | 3' | 4' | 5' |
|---|---|---|---|---|---|
| NUMBER FOR FIRST PROCESSING | 1 | 5 | 6 | 7 | 8 |
| FUNCTION SIZE (UNIT: BYTE) | 5 | 50 | 67 | 90 | 95 |
| CALL COUNT (UNIT: NUMBER OF CALLS) | 4 | 10 | 11 | 5 | 3 |

FIG. 15 (PRIOR ART)

```
callf void func(void)
{
    static int i;
} void main()
{
    func();
}
```
151

FIG. 16 (PRIOR ART)

```
    ; line      1 : callf void func(void)
    ; line      2 : {
    @@CALFS    CSEG    FIXEDA                    162
    _func:
    ; line      3 :     static int i;
    ; line      4 :     i++;
          movw  hl, !L0003     ; i
          incw  hl
          movw  !L0003, hl     ; i
    ; line      5 : }
          ret
    ; line      6 : void main()
    ; line      7 : {
    @@CODES    CSEG    BASE
    _main:
    ; line      8 :     func();
          callf !_func
    ; line      9 : }
          ret
```

161 points to @@CALFS; 163 points to callf !_func

LANGUAGE PROCESSOR AND LANGUAGE PROCESSING METHOD TO GENERATE OBJECT PROGRAMS BY COMPILING SOURCE PROGRAMS

BACKGROUNDS OF THE INVENTION

1. Field of the Invention

The present invention relates to a language processor and a language processing method used for object program generation by means of source program compilation, and particularly relates to a language processor and a language processing method which places some of the functions used in syntax analysis in a specific area, so as to call them using specific instructions.

2. Description of the Related Art

When a language processing program translates a source program which has been entered, it generates as a result of such translation a file called an "object module file". Generally, software processed by a language processing program is required to have quickness in its execution performance. To accomplish this requirement, it is necessary that the output object module file as a result of language processing is small in size and can be executed quickly.

On the other hand, in the field of microcomputer technology, the program space tends to be increased so as to accommodate the program size becoming larger resulting from more and more complicated application programs. As the program space increases, the data width of the address to locate the program increases and call instructions to call functions have more bytes than conventional ones, resulting in a lower processing speed.

As a solution to this problem, a microcomputer having a specific area of a limited size in a part of the program space (hereinafter referred to as the specific space) has been developed. Certain functions are placed in the specific area and can be called by exclusive call instructions. Such an exclusive call instruction has a reduced number of bytes than an ordinary call instruction, and the processing speed can be made higher using such exclusive call instructions. However, the specific space size is limited and the language processing program cannot place all functions in the specific space. Thus, such a system provides a means to allow the source program creator (hereinafter referred to as the user) to specify the functions to be placed in the specific space using keywords, so that the functions specified by the keywords only are arranged in the specific space and called by the exclusive call instructions.

FIG. 12 shows the configuration of a conventional language processor. In the figure, a source program file 121 is entered to a language processor 122 and the language processor 122 analyzes the file contents with a syntax analysis section 123. When it recognizes a keyword to place a function in the specific space (specific space keyword) during analysis, a keyword recognition section 124 stores the function specified by such keyword. Upon completion of syntax analysis, control is passed to a code generation section 125 and codes are generated by selecting the instructions according to the analysis results.

When selecting a call instruction for a function in the code generation process, it is firstly checked whether such function is one of those placed in the specific space stored in the keyword recognition section 124. If so, the exclusive call instruction is selected. Upon completion of code generation, control is passed to an object file output section 126, which outputs the generated codes.

The object file output section 126 collects the definition parts of the functions placed in the specific space as stored in the keyword recognition section 124, separates them from ordinary function definition parts, and outputs them as an object module file 127 with adding the placing attribute for the specific space. Addition of the placing attribute for the specific space assures that the applicable module is placed in the specific space.

Referring now to the flowchart of FIGS. 13 and 14, a conventional processing algorithm is described below.

First of all, the source program file 121 is entered (Step 1301). Then, the syntax analysis is repeatedly executed until the end of the source program file 121 (Steps 1302 and 1303 in FIG. 13).

When a specific space keyword is recognized during syntax analysis (Step 1304), the keyword recognition section 124 stores the applicable function name (Step 1305). Then, the processor returns to Step 1302 to check whether the source program file has been processed to the end and repeats a series of processes until it reaches the end of the source program file (Steps 1302 to 1305).

Next procedure is code generation.

A code generation section 125 reads the syntax analysis result obtained by the syntax analysis section 123 and examines it to see whether or not it is a function call until completion of code generation (Steps 1306, 1307). If it is not a function call, ordinary code generation is executed (Steps 1307 and 1311). If it is a function call, the section refers to the keyword recognition section 124 to check whether that function is one of those specified by the specific space keyword (specific space function) stored in Step 1305 (Step 1308). When that function is one of the specific space functions, exclusive call instruction is used for code generation (Step 1309). If it is not a specific space function, code generation is executed using an ordinary call instruction (Step 1310). Then, the processing returns to Step 1306 to check whether code generation has been completed by reading the syntax analysis result and repeats a series of processes until completion of code generation (Steps 1306 to 1311).

Next procedure is output of an object module file.

When the generated code is for the definition part of a specific space function, the object file output section 126 outputs such code part to a segment with the placing attribute for the specific space attached (Steps 1312 and 1313 in FIG. 14). Here, a segment represents a group of codes, which is a minimum unit of placing when arranging codes in the program space. The placing attribute attached to the segment specifies where to place the segment.

When it is a code other than those for the definition part of any specific space function, it is output to an ordinary segment (Step 1314). Thus, the code parts are output with separating the specific space functions and ordinary functions. Then, the data part including variable area is output (Step 1315), and the code part and the data part are output together as an object module file 127. This completes the procedure (Step 1316).

An example of such technology is disclosed in the document "NEC 78K/IV series 16-bit single-chip microcomputer—Instructions IEU-844B" (1995, NEC Corp.). This document describes the technology to directly make subroutine calls using 2-byte call instructions (CALLF) for the area of 0800H-00FFFH (CALLF entry area) in the program space, while a call instruction usually has three bytes. Since a CALLF instruction has 2 bytes, the object module size in the program can be reduced when compared with the case using ordinary three-byte call instructions (CAL1).

This C compiler CC78K4 for microcomputers has "callf" (151) as the keyword for specific space placing as shown in FIG. 15 in order to effectively take advantage of CALLF instructions. A function func( ) with the keyword callf attached is to be placed in the CALLF entry area.

FIG. 16 shows an object module file resulting from compilation of data in FIG. 15.

For the function func( ), which is called in the function main ( ), the code is generated using the CALLF instruction (163). The code of the definition part in the function func ( ) is output to the segment @@CALFS (161) having the placing attribute FIXEDA (162). The compiling technology described above is disclosed in "NEC 0078K4 series—Language EEU-961" (1994, NEC Corp.).

Though FIGS. 12, 13 and 14 show an example where a source program file and an object module file are handled, but several source program files and several object module files may be handled. In such case, several object module files can be obtained by processing each of the source program files according to the procedure described referring to the flowchart in FIGS. 13 and 14.

Thus, a conventional system has a small specific space where a limited number of functions only can be placed, and has adopted the method to place the functions specified by the keyword in the specific space. By placing the user-selected functions in the specific space, a sufficient object module file performance (small object module size and high processing speed) can be obtained. Suppose there are 20 function calls in the above example. When no function has keyword specification, the required capacity is 3 bytes*20= 60 bytes. In contrast, when all of them have keyword specification, the required capacity is 2 bytes*20=40 bytes. In other words, the code size can be reduced to two thirds.

As described earlier, the keyword to place a function in the specific space is specified by the user according to the conventional language processing method. This means that the user has to check whether the total size of the functions to be placed in the specific space is within the specific space size. The user checks the function sizes in the first compilation and selected the functions to place in the specific space, adds the keyword and then obtains a target object module file in the second compilation.

As shown above, the conventional language processing method has a drawback: unless the user specifies the keyword for placing functions in the specific space, ordinary call instructions are results in generation of a large size object module, which leads to time-consuming execution.

Even when the keyword to place functions in the specific space is specified, it is specified by the user. This means that the user has to bear a heavy burden. Specifically, the user has to check whether the total size of the functions to be placed in the specific space is within the size of the specific space. The user is required to check the function sizes in the first compilation, decide the functions to place in the specific space, add the keyword to them and then obtain the target object module file in the second compilation at last. Compilation has to be made at least twice, which lowers the work efficiency.

Further, under the restriction that functions have to be placed in the limited area in the specific space, it is advantageous to place the functions with many calls in the specific space as far as possible. However, it is a burden for the user to administrate all function calls and make the optimum selection when the source program is large in scale.

Particularly, the application programs are recently becoming sophisticated and complicated resulting in larger scales, and the size of the specific space in the microcomputer is also becoming larger. Under such situation, the performance of the obtained object module file depends on the selection of functions to be placed in the specific space, and this makes the user's burden much heavier.

Besides, the keyword is in the extended specification peculiar to the language processing, and generally, it is not added to the program so as to make the source program portable. Thus, the extended keyword cannot always be used for function placing in the specific space.

SUMMARY OF THE INVENTION

It is a first object of the present invention to provide a language processor and a language processing method which can automatically designates the optimum functions to be placed in the specific area without any keyword setting by the user and reduce the size of the generated object module file.

It is a second object of the present invention in addition to the above first object to provide a language processor and a language processing method which can save the program space and improve the execution speed of the object module file.

It is a third object of the present invention to provide a language processor and a language processing method which, by automatic function selection without keyword setting by the user, can always select the optimum combination of functions to be placed in the specific space and thereby can achieve the smallest possible object module file, regardless of the source program scale or the user's skill.

It is a fourth object of the present invention to provide a language processor and a language processing method which, by repeating the selection of functions to be placed in the specific space several times in one compilation, can select the optimum functions without repeating the compilation process itself and can thereby improve the user's work efficiency.

It is a fifth object of the present invention to provide a language processor and a language processing method which can obtain an object module file having a good performance without the need of keyword addition to specify the functions to be placed in the specific space and without modification of the source program for portability when that source program has been used in a different language processing.

According to the first aspect of the invention, a language processor which compiles source programs to generate object files with a syntax analysis means to analyze entered source programs, a code generation means to generate instruction codes according to the analysis results and an object file output means to output the generated instruction codes as an object program file, comprises:

a function call counter means for counting the number of calls for each function during syntax analysis by said syntax analysis means;

a function data storage means for storing the call count for each function counted by said function call counter means and the code size of each code for each function generated by said code generation means; and a specific space function designation means for referring to the call count and the code size for each function stored in said function data storage means and for designating the functions to be placed in the specific area held by the microcomputer in the program space so that the total sum of the function code sizes does not become larger than the size of said specific area with placing priority to the functions with many calls.

In the preferred construction, the specific space function designation means refers to the code size stored in said function data storage means, selects all combination patterns which can be accommodated in said specific area from all possible function combination patterns, refers to the call count for each function stored in said function data storage means, determines the total function call count for each of said selected combination patterns, and designates the functions in the combination pattern having the largest total function call count as those to be placed in said specific area.

In another preferred construction, the specific space function designation means generates a tree structure having functions as nodes by connecting said functions as nodes so that the sum of the code sizes of said functions as nodes arranged on a series of paths is not more than the size of said specific area and selects, from the paths constituting said tree structure, the path having the largest sum of call counts for the functions arranged on it to designate the functions arranged on said path as those to be placed in said specific area.

In another preferred construction, the specific space function designation means may examine, after designation of functions to be placed in said specific area in the program space, whether there are any more functions which can be placed in the remaining area of said specific area and repeat designation of functions to be placed in said specific area until the time it finds no such function.

Preferably, the specific space function designation means determines the remaining area size when the functions designated to be placed in said specific area are placed in the specific area held by said microcomputer in the program space, designates the functions to be placed in said remaining area by the same processing as designation of the functions to be placed in said specific area, and repeats said remaining area size determination and function designation processing until the time it finds no function which can be placed in said specific area.

According to the second aspect of the invention, a language processing method which analyzes entered source programs, generates instruction codes according to the analysis results and outputs the generated instruction codes as an object program file, comprises the steps of:

a first step for counting the number of calls for each function during syntax analysis;

a second step for storing the counted number of calls for each function and the code size of each code for each function generated according to said source program analysis results; and a third step for referring to said call count and said code size for each function and for designating the functions to be placed in the specific area held by the microcomputer in the program space so that the total sum of the function code sizes does not become larger than the size of said specific area with placing priority to the functions with many calls.

In this case, the third step further comprises a step for referring to said stored code size and select all combination patterns which can be accommodated in said specific area from all possible function combination patterns, a step for referring to said stored call count for each function and determine the total function call count for each of said selected combination patterns, and a step for designating the functions in the combination pattern having the largest total function call count as those to be placed in said specific area.

In the above-mentioned construction, the third step further comprises a step for generating a tree structure having functions as nodes by connecting said functions as nodes so that the sum of the code sizes of said functions as nodes arranged on a series of paths is not more than the size of said specific area, and a step for selecting, from the paths constituting said tree structure, the path having the largest sum of call counts for the functions arranged on it and for designating the functions arranged on said path as those to be placed in said specific area.

Preferably, the third step may comprises a step for referring to said stored code size and select all combination patterns which can be accommodated in said specific area from all possible function combination patterns, a step for referring to said stored call count for each function and determine the total function call count for each of said selected combination patterns, a step for designating the functions in the combination pattern having the largest total function call count as those to be placed in said specific area, a step for determining the remaining area size when the functions designated to be placed in said specific area are placed in the specific area held by said microcomputer in the program space, and a step for designating the functions to be placed in said remaining area by the same processing as designation of the functions to be placed in said specific area, wherein the third step repeats said processing in the above steps until the time it finds no function which can be placed in said specific area.

According to the third aspect of the invention, a computer readable memory to store a computer program which analyzes entered source programs, generates instruction codes according to the analysis results and outputs the generated instruction codes as an object program file, said computer program comprises the steps for controlling the computer to:

a first step for counting the number of calls for each function during syntax analysis;

a second step for storing the counted number of calls for each function and the code size of each code for each function generated according to said source program analysis results; and a third step for referring to said call count and said code size for each function and for designating the functions to be placed in the specific area held by the microcomputer in the program space so that the total sum of the function code sizes does not become larger than the size of said specific area with placing priority to the functions with many calls.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 15 is a diagram to show an example of source program; and

FIG. 16 is a diagram to show the object module obtained by compilation of the source program in FIG. 15.

DESCRIPTION OF THE PREFERRED EMBODIMENT

Figure 1:
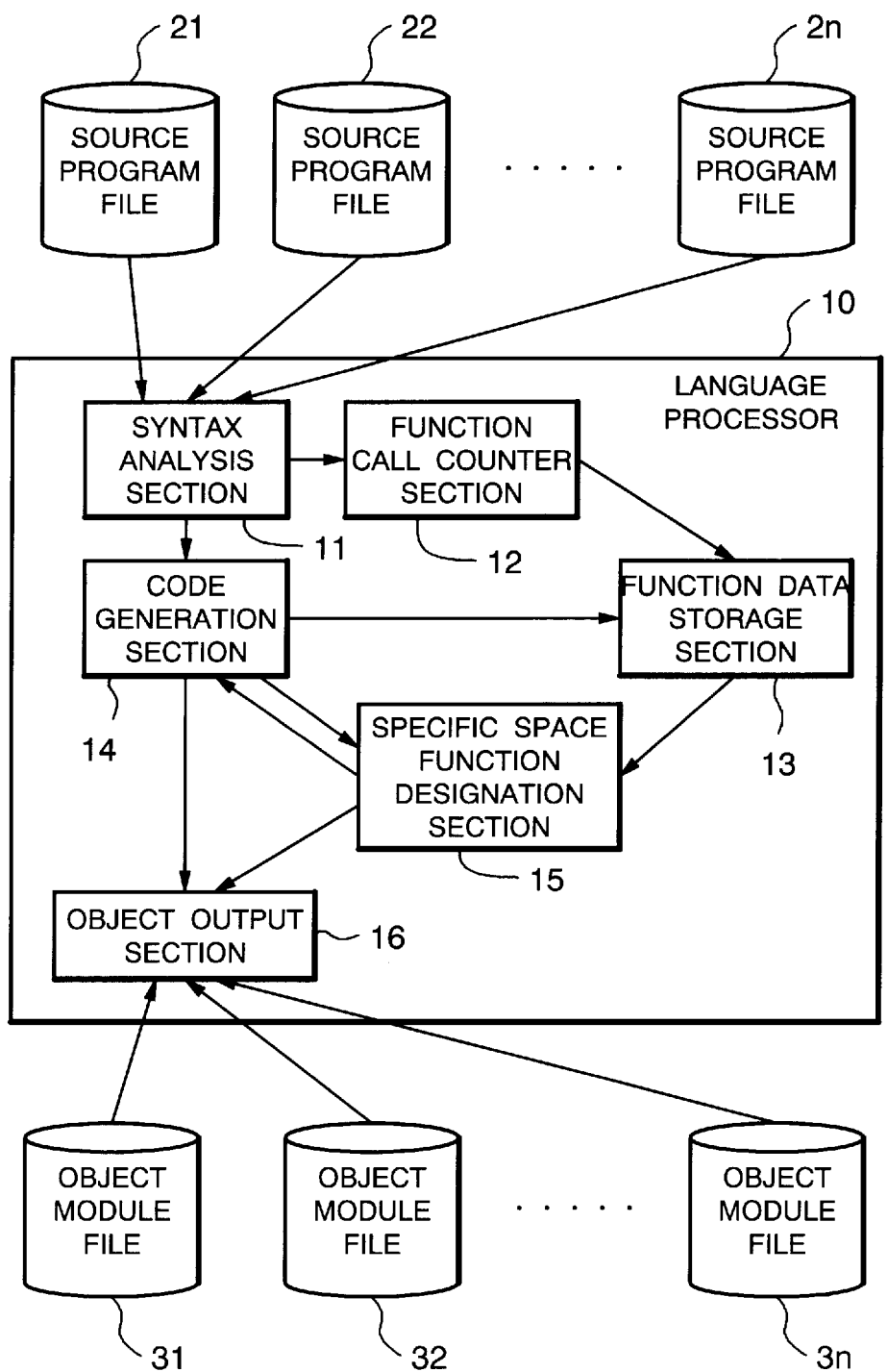
FIG. 1 is a block diagram to show the configuration of a language processor according to a first embodiment of the present invention.

Referring to the attached figures, preferred embodiments of the present invention will be described in details below. FIG. 1 is a block diagram to show the configuration of a language processor according to a first embodiment of the present invention.

In the figure, a language processor 10 of this embodiment comprises a syntax analysis section 11 to analyze the contents of the entered source program files 21 to 2n, a code generation section 14 to generate codes based on the syntax analysis results, and an object file output section 16 to output the codes generated by the code generation section 14 as the object module files 31 to 3n, and further comprises a function call counter section 12 which counts the number of function calls recognized during syntax analysis, a function data storage section 13 to store the number of function calls counted by the function call counter section 12 and the size of the codes generated by the code generation section 14 and a specific space function designation section 15 to designate the functions to be placed in the specific space. In the above configuration, the syntax analysis section 11, the code generation section 14 and the object file output section 16 are realized as CPU controlled by programs, and have functions similar to those in conventional systems. Note that the figure shows major characteristic configuration of this embodiment only, and other elements are omitted.

The language processor 10 of this embodiment can be realized as a computer system, and the functions of the syntax analysis section 11, the function call counter section 12, the function data storage section 13, the code generation section 14 and the specific space function designation section 15 and the object file output section 16 are realized by control using a computer program. In this case, the computer program to control the sections can be supplied as data stored in a computer readable memory in the form of magnetic disks or memory.

The function call counter section 12 is realized with a CPU under program control. It counts the number of function calls recognized during syntax analysis of a source program by the syntax analysis section 11.

The function data storage section 13 is realized with a memory such as a RAM, and stores the number of function calls counted by the function call counter section 12. It also stores the size of the code generated in the first processing by the code generation section 14 for each function. The number of function calls and the code size thus stored are utilized in processing by the specific space function designation section 15.

The specific space function designation section 15 is realized with a CPU under program control. It designates the functions to be placed in the specific space (specific space functions) based on the number of function calls and the code size stored in the function data storage section 13. Detailed procedure to designate the functions to be placed in the specific space will be described later. The processing results by the specific space function designation section 15 are used for the second and following code generation processing by the code generation section 14 and the placing attribute addition to the code by the object file output section 16.

Referring now to the flowchart in FIGS. 2 and 3, detailed processing in this embodiment is described below.

First of all, whether the analysis has been completed for all source programs files 21 to 2n. If the analysis has not been completed, the applicable source program file is entered (Steps 201 and 202 in FIG. 2). The syntax analysis section 11 repeatedly executes the syntax analysis until it reaches the end of source in the entered source program file (Steps 203 and 204).

If a function call is recognized in the course of syntax analysis, the function call counter section 12 counts up and store the call count corresponding to the applicable function among the function call counts stored for each function in the function data storage section 13 (Steps 205 and 206). When the end of the source program file is reached by repeated processes above, the processing of Steps 202 to 206 is executed for the following source program file. When the analysis is completed for all source program files 21 to 2n by repeating such processes, control is passed to the code generation section 14.

The code generation section 14 executes the first code generation for all syntax analysis results (Step 207). In this first code generation, as in the code generation of the conventional language processing method, whether the data is function or not is judged first. When it is not a function, ordinary code generation is executed. When it is a function, ordinary code generation is executed using ordinary call instruction.

In code generation, code size for each function is obtained. The function data storage section 13 stores the obtained code size for each function in addition to the number of calls for each function already stored (Step 208).

Next, the specific space function designation section 15, based on the number of calls and the code size for each function, designates the functions to be placed in the specific space so that the total size of the functions can be contained in the specific space size, with placing priority to the functions with large call counts (Step 209). Detail of this procedure will be described later. When the functions to be placed in the specific space are decided, the call instructions calling such functions are changed from ordinary call instructions to exclusive call instructions. For this purpose, the first code generation results are scanned from the start, and whether the applicable code is a function call or not is checked until the end of the results (Steps 210, 211). When the code is a function call, whether or not it is a specific space function is checked by inquiry to the specific space function designation section 15 (Step 212). If it is so, the ordinary call instruction is replaced with the exclusive call instruction (Step 213). These processes are repeated until completion of scanning for the code generation results.

Next process is object output.

Figure 3:
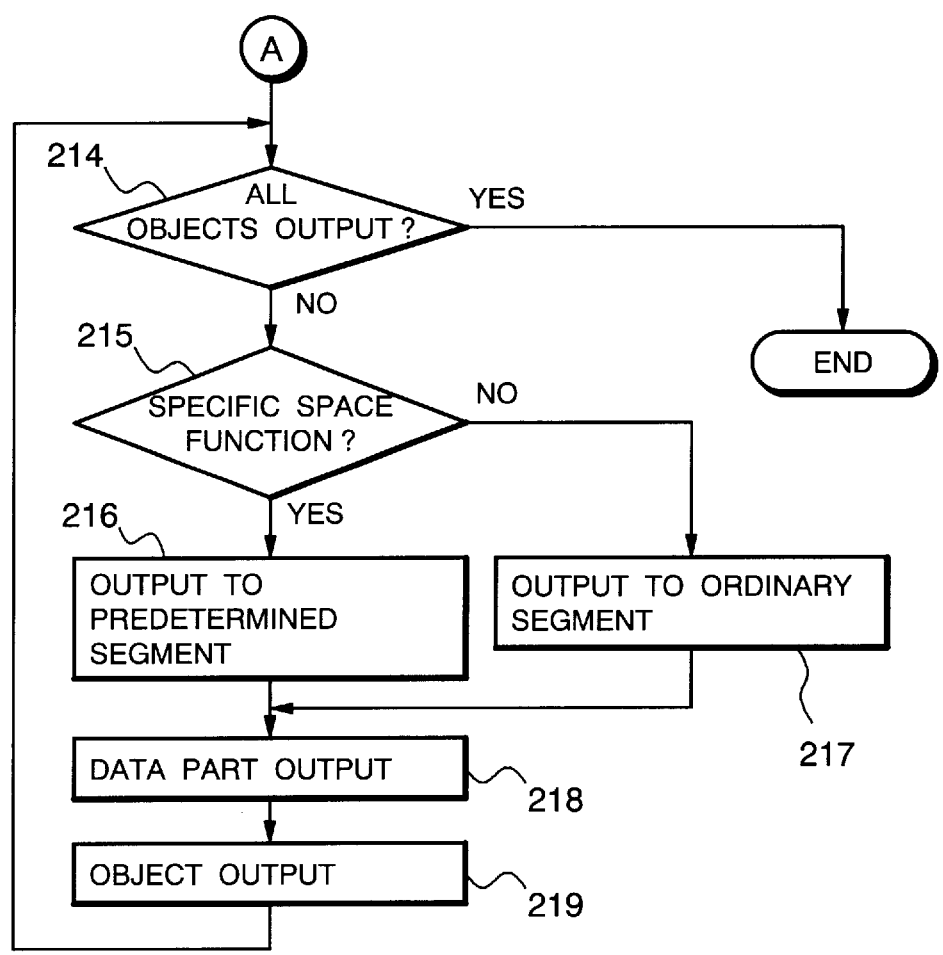
FIG. 3 is a flowchart to show the operation in this embodiment illustrating the output operation of an object module file.

The object file output section 16 checks, until it outputs all objects for each source program file, whether the generated code is the same as the definition part of the specific space function by inquiry to the specific space function designation section 15 (Steps 214 and 215 in FIG. 3). Then, the applicable code part is output to the segment having the placing attribute for the specific space (Step 216). Segment and the placing attribute have the same meaning as described in the explanation about the conventional technology. When the applicable code is not the same as the definition part code of the specific space function, it is output to the ordinary segment (Step 217). Thus, the code parts are output with separating the specific space functions and ordinary functions. Then, the data part including variable area is output (Step 218), and the code part and the data part are output together as an object module file (Step 219).

The above processes are repeated until object module files corresponding to all source program files have been output to terminate the processing. Note that an object module file here means a relocatable object module file or an assembler source module file written in assembly language.

Referring next to the flowchart of FIGS. 4 and 5, the processing at the specific space function designation section 15 is described in details below.

Firstly, all combination patterns of functions which can be accommodated by the specific space size. Then, the total sum of function calls in each pattern is determined. The pattern with the largest total of function calls is the optimum selection of functions to be placed in the specific space. A specific example of such operation is shown in FIGS. 4 and 5. These figures show the method where function combination patterns using the tree structure and, while making the tree structure, the pattern with the largest sum of function calls is determined.

Figure 4:
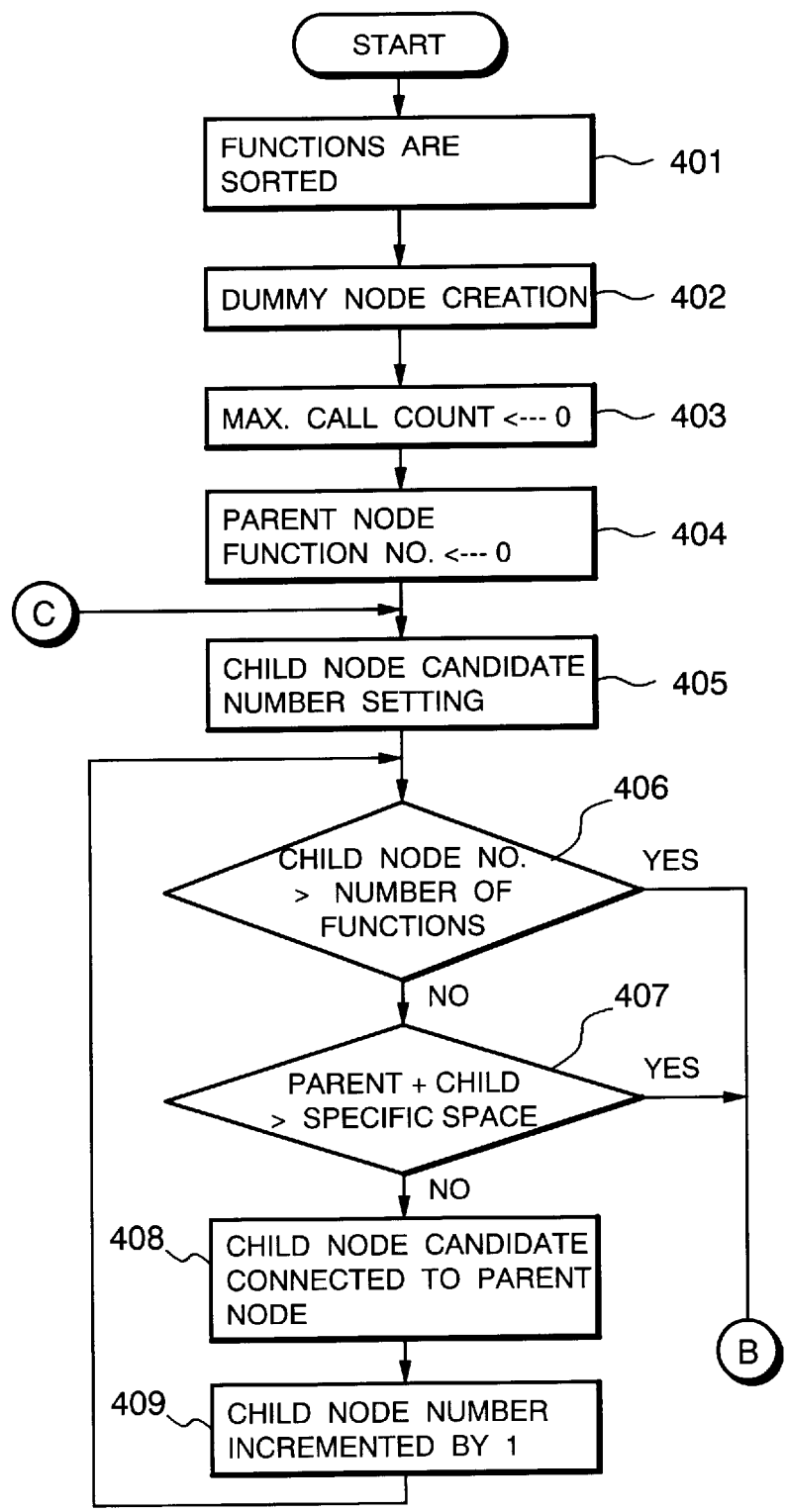
FIG. 4 is a flowchart to show the operation at the specific space function designation section according to this embodiment.

All functions are sorted in ascending size order and numbered (Step 401 in FIG. 4). Then, a node having dummy function No.=0, function size=0 and function call count=0 is created (Step 402). The maximum call count and the parent node function number are both initialized to 0 (Steps 403, 404). From here, child nodes for the functions which can be placed in the specific space are created under the parent node in question.

As the function number of a child node candidate, "Parent node function number+1" is set (Step 405). When the child node candidate function number is less than the total of the functions and the sum of the function sizes of the parent node and the child node candidate is less than the size of the specific space, the child node candidate is connected to the parent node. At the same time, the child node function size is updated to the sum of the function sizes of the parent and child nodes and the call count of the child node is updated to the sum of the call counts for the parent and child nodes (Steps 406, 407, 408). Then, with the function number of a child node candidate incremented by one (step 409), the procedure from Step 406 is repeated to see whether the next candidate can be connected as another child node. When the function number of a child node candidate becomes larger than the total of the functions or when the sum of the function sizes of the parent and child nodes exceeds the specific space size, no more child node can be connected to that parent node. The system proceeds to the next processing.

When one or more child node has been connected to the parent node ~in question, attention is directed to the first child node. Considering this as a parent node, the procedure from 405 to connect child nodes (Steps 410 and 411 in FIG. 5) is repeated. If no child node can be connected to the parent node in question, it means that the node is at the end of the tree structure. In this case, the maximum call count is updated. When the maximum call count is smaller than the call count for the parent node in question, the latter is specified as the maximum call count and the path from the parent node No. 0 to the number of the parent node in question is stored as the optimum path (Steps 412 and 413). In other cases, the maximum call count is not updated.

Next step is processing for the node higher than the previous one by one level (Step 414). When the processed node is not the final child node of that level, the processing proceeds to the following child node at the same level (Step 415). Then, it returns to Step 405, where the child node is connected considering the applicable node as the parent node (Step 416). When the applicable node is the final child node, then it is checked whether the parent node number is 0 or not (Steps 415, 417). When the applicable node number is not 0, the processing returns to the procedure to go to the node higher for one level (Step 414). If the parent node number is 0 in Step 417, it means that the whole tree structure has been completed, and the processing terminates. The functions of the nodes in the optimum path stored at the time of processing termination are the function combination to be placed in the specific space.

Figure 5:
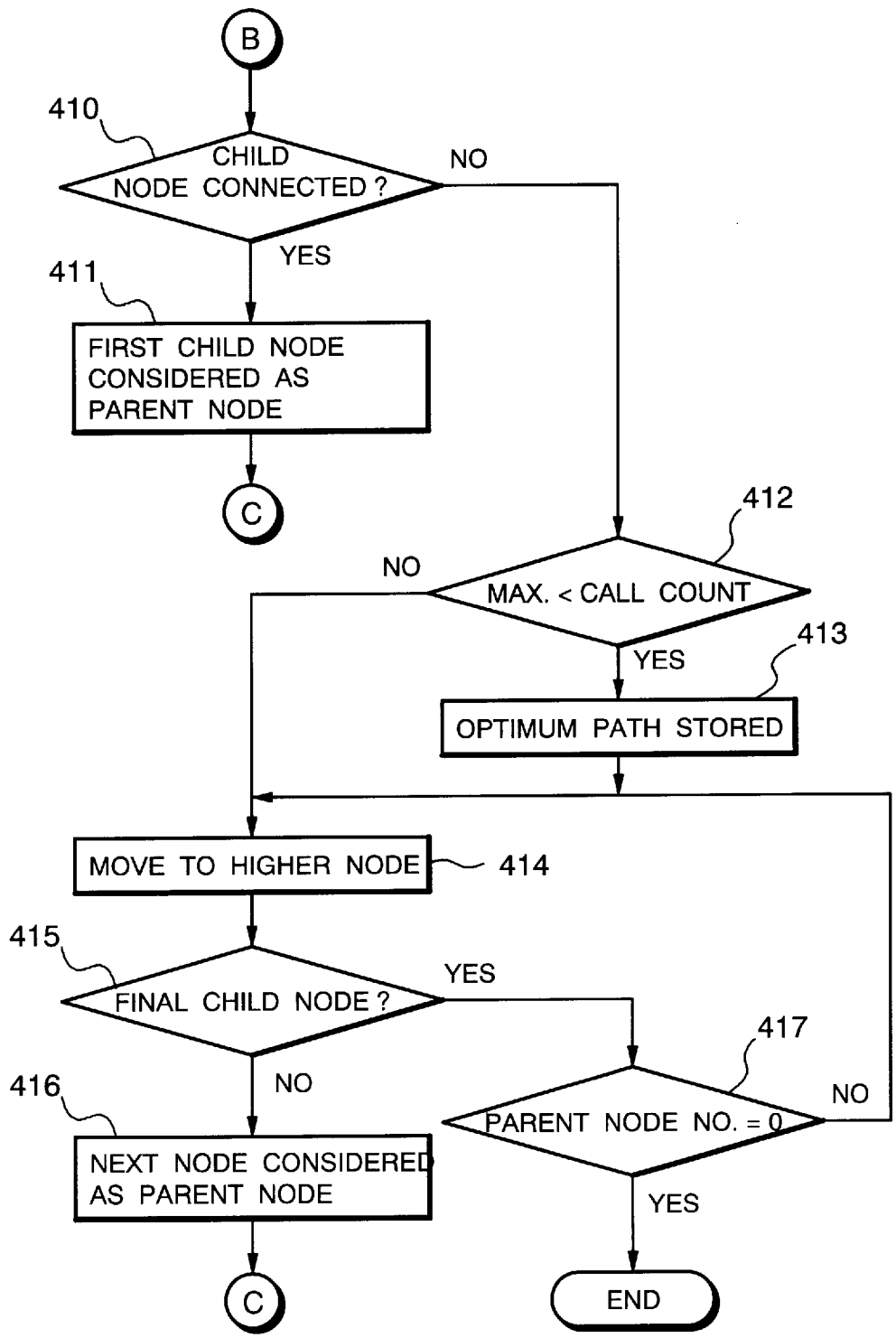
FIG. 5 is a flowchart to show the operation at the specific space function designation section according to this embodiment.
Figures 6, 7:
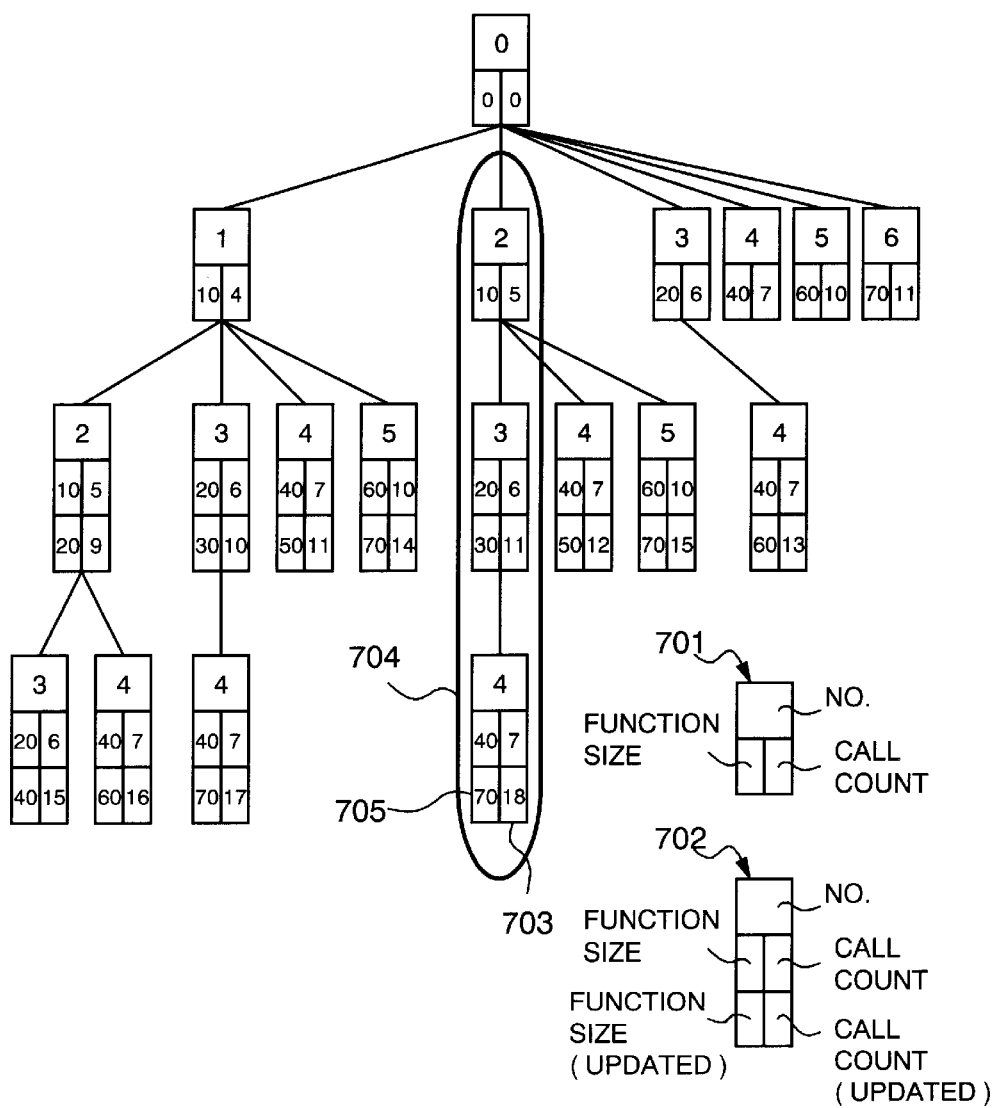
FIG. 6 is a diagram to show an example with sorted functions according to this embodiment.
FIG. 7 is a tree structure diagram to show the result when the functions of FIG. 6 are processed by the specific space function designation section.

For example, suppose the functions are as shown in FIG. 6 after sorting all of them in ascending order. In this example, the specific space size is 75 bytes. FIG. 7 shows the tree structure built according to the processing in FIGS. 4 and 5. As shown with 701, one node consists of the number, the function size and the call count. For easier understanding of update during child node connection, the node 702 indicates, in addition to the number, the function size and the call count, the updated function size and the updated call count. The numeral 703 shows the largest sum of function call counts, which is 18. The path 704 to this node comprises the functions to be placed in the specific space. In this example, it is decided to select the functions Nos. 2, 3 and 4. The numeral at 705 indicates that the sum of the sizes of the selected functions is 70 bytes. Thus, 18 function calls are replaced with exclusive call instructions and the function definition parts of 70 bytes in total are arranged in the specific space.

The processing operation in the specific space function designation in FIGS. 4 and 5, the pattern with the largest sum of call counts for the functions is selected from all function combination patterns which can be accommodated in the specific space size. This method is complicated but achieves the smallest possible object module size.

Suppose functions are selected from those within the specific space size in the descending order of the call count. In the example of FIG. 6, the function of No. 6 with a size of 70 bytes and call count of 11 is the function called most, and its size can be accommodated in the specific space size (75 bytes). If this function No. 6 is selected here, the remaining specific space size is 5 bytes. All other functions are larger than 5 bytes, and no more function can be placed in the specific space. The selected function of No. 6 has the call count of 11, and these 11 calls only can be changed to the exclusive call instructions. As shown in this example, if a function with a large call count is large in size, it prevents other functions from being placed. Rather than this, placing several small size functions having moderate call counts may result in a large sum of call counts, so that more instructions are replaced with exclusive call instructions. Thus, it is the optimum selection to list all possible combinations of placed functions and select one with the largest function call count total.

A language processor of this embodiment as described above realizes, if 18 function calls are changed from 3-byte ordinary call instructions to 2-byte exclusive call instructions, reduction of 18 bytes in the object module size, in comparison with the case where the user does not specify any keyword in a conventional language processor.

Suppose the user using a conventional language processor specifies the functions to place in the specific space with the keyword. If the function No. 6 having a size of 70 bytes and a call count of 11 in FIG. 6 is selected as the function with the largest call count to be placed in the specific space area, the object module size is decreased by 11 bytes only. Thus, the object module size can be reduced much more in this embodiment.

As described earlier, according to the present invention, the call count for each function counted by the function call counter section 12 during syntax analysis is stored together with the code size of each function generated by the code generation section 14 in the function data storage section 13, and the specific space function designation section 15 refers to such data to select the appropriate functions so that the sum of the function sizes is within the size of the above area, placing priority to the functions with many calls. Thus, the functions to be placed in the specific area can be automatically decided without the need of keyword setting by the user.

The specific space function designation section 15 repeats designation of functions to be placed in the specific area several times and thereby enables selection of optimum functions without repeating the compilation process itself by the language processor.

A second embodiment of the present invention is now describe below.

In the first embodiment above, the system executes the designation process only once to select the functions to be placed in the specific space so that their size total can be accommodated in the specific space size. In this second embodiment, however, has an additional process to check again for any function to be placed in the specific space after designating the functions to be placed there and changing the applicable instructions to the exclusive call instructions. This enables placing of more functions in the specific space.

The configuration of a language processor according to this embodiment is the same as that of the language processor according to the first embodiment as in FIG. 1, and description about it is omitted here.

Figure 8:
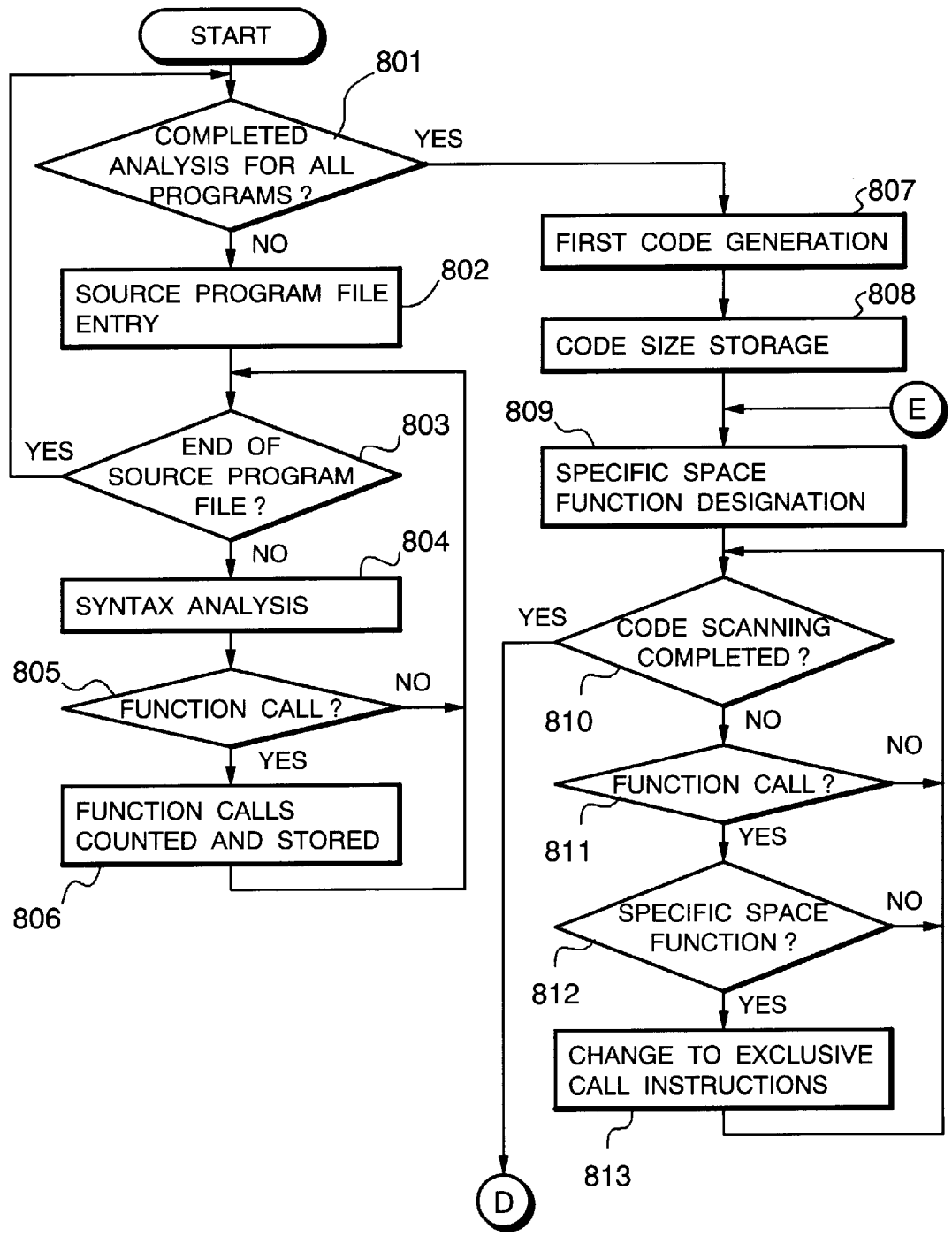
FIG. 8 is a flowchart to show the operation of a language processor according to a second embodiment of the present invention illustrating the procedure from code generation to call instruction setting for the specific space functions.
Figure 9:
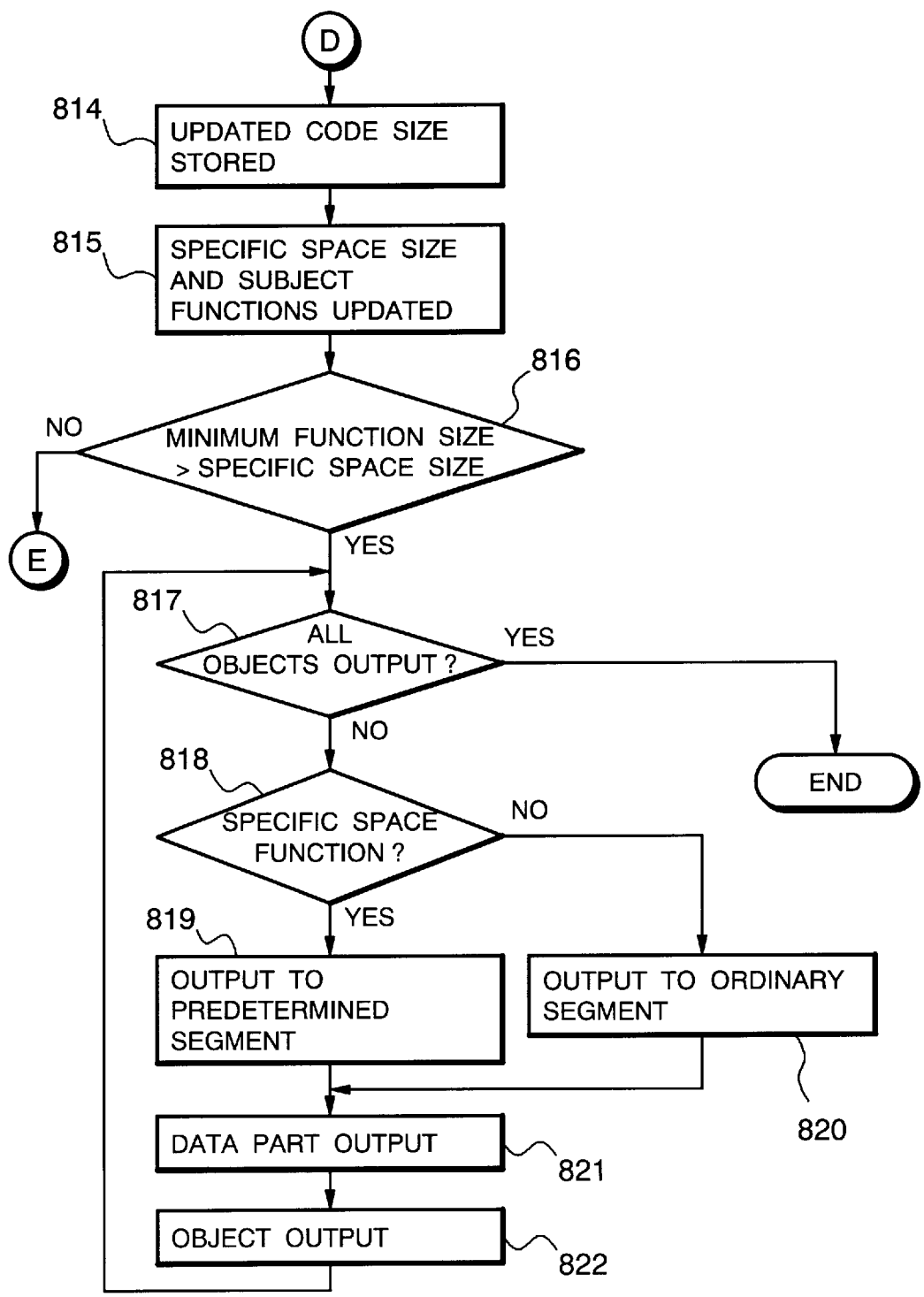
FIG. 9 is a flowchart to show the operation of a language processor according to a second embodiment of the present invention illustrating the object module file output operation.

Referring to the flowchart of FIGS. 8 and 9, the processing in this embodiment is described in details below.

Figure 2:
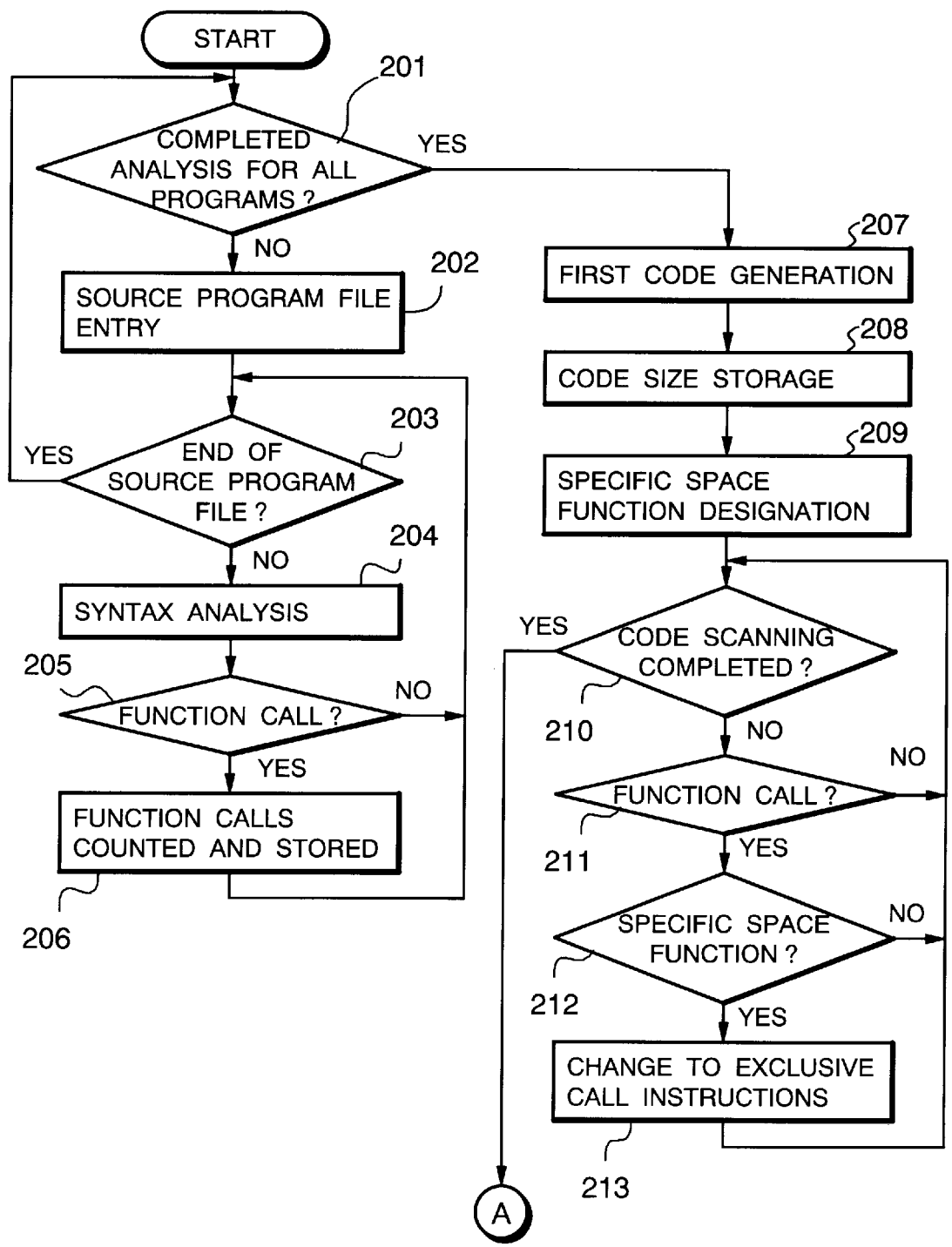
FIG. 2 is a flowchart to show the operation in this embodiment illustrating the processes from code generation to call instruction setting for the specific space functions.

Processing of Steps 801 to 813 from the syntax analysis to code generation completion is the same as that of Steps 201 to 213 according to the first embodiment as shown in FIG. 2. When the first designation of specific space functions and change of call instructions to exclusive call instructions are completed, the code size is reduced by such change to exclusive call instructions, and the updated code size is stored for each function (Steps 810, 814).

Next, the size of the functions already designated to be placed in the specific space is subtracted from the specific space size, and the difference is set as the new specific space size. After removing the functions already designated to be placed in the specific space from all functions, the remaining functions are set as the subject functions (Step 815). By rejecting the functions once selected as those for the specific space, designation of functions to be placed in the specific space can be made in less steps.

When the smallest size function among the new subject functions is smaller than the specific space size, the processing returns to Step 809 to designate the functions to be placed in the specific space so that the total size of the functions can be accommodated in the specific space size, placing priority to the functions with a large call count (Step 816) and repeats the procedure from Steps 809 to 816.

On the other hand, when the smallest size function among the new subject functions is larger in size than the specific space, it is impossible to place any more function in the specific space. In this case, the system terminates code generation and proceeds to object module file output (Step 816). The object module file output procedure of Steps 817 to 822 is the same as that of Steps 214 to 219 in the first embodiment as shown in FIG. 3.

In the example shown in FIG. 6, when the specific space has 75 bytes, the functions Nos. 2, 3 and 4 are selected as shown in FIG. 7. The size total of these functions is 70 bytes. When the functions to be placed in the specific space are designated according to this embodiment, the system searches for possible combination of functions which can be placed in the remaining 5-byte area.

The total of call counts for functions Nos. 2, 3 and 4 is 18 and, supposing that the code size is reduced by one byte per call, the reduced amount is 18 bytes in total.

Figures 10, 11:
FIG. 10 is a diagram to shown an example with functions after the second sorting according to this embodiment.
FIG. 11 is a tree structure diagram to show the result when the functions of FIG. 10 are processed by the specific space function designation section.
Figure 12:
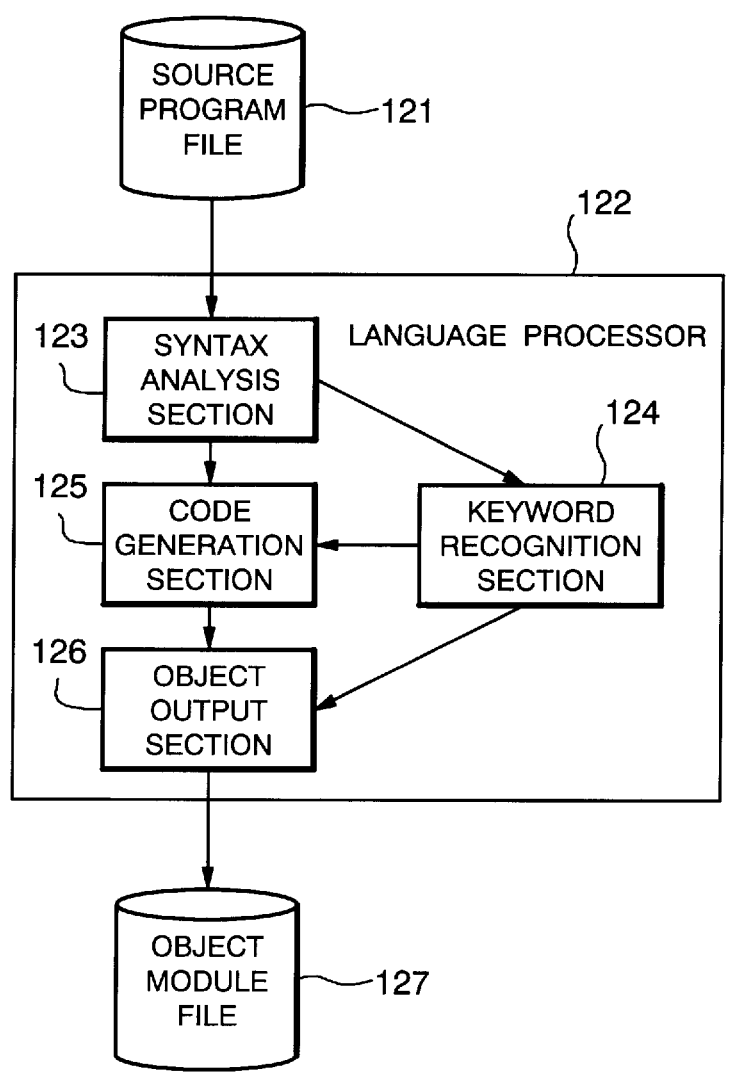
FIG. 12 is a block diagram to show the configuration of a conventional language processor.
Figure 13:
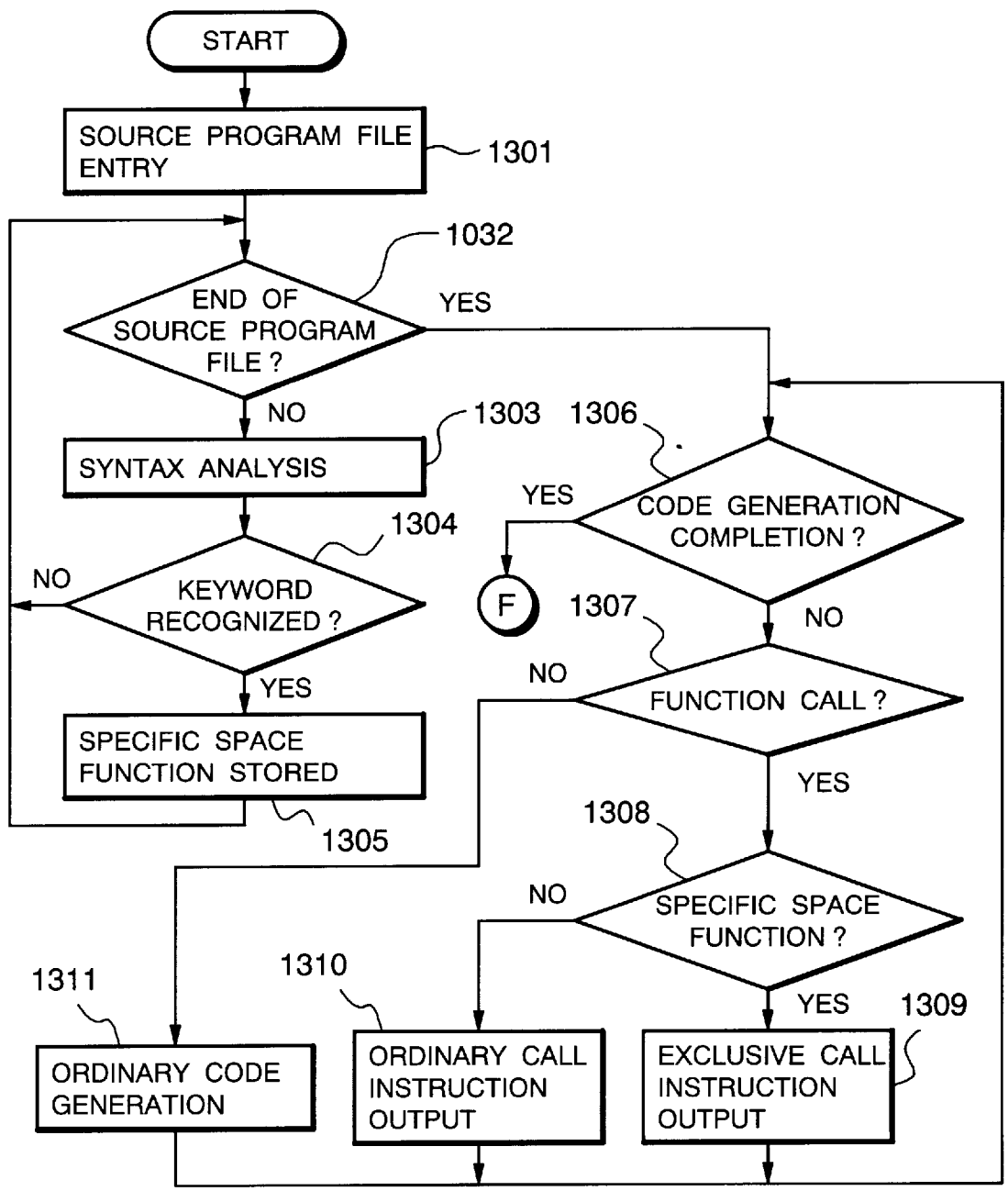
FIG. 13 is a flowchart to show the operation of a conventional language processor illustrating the procedure from code generation to call instruction setting for the specific space functions.
Figure 14:
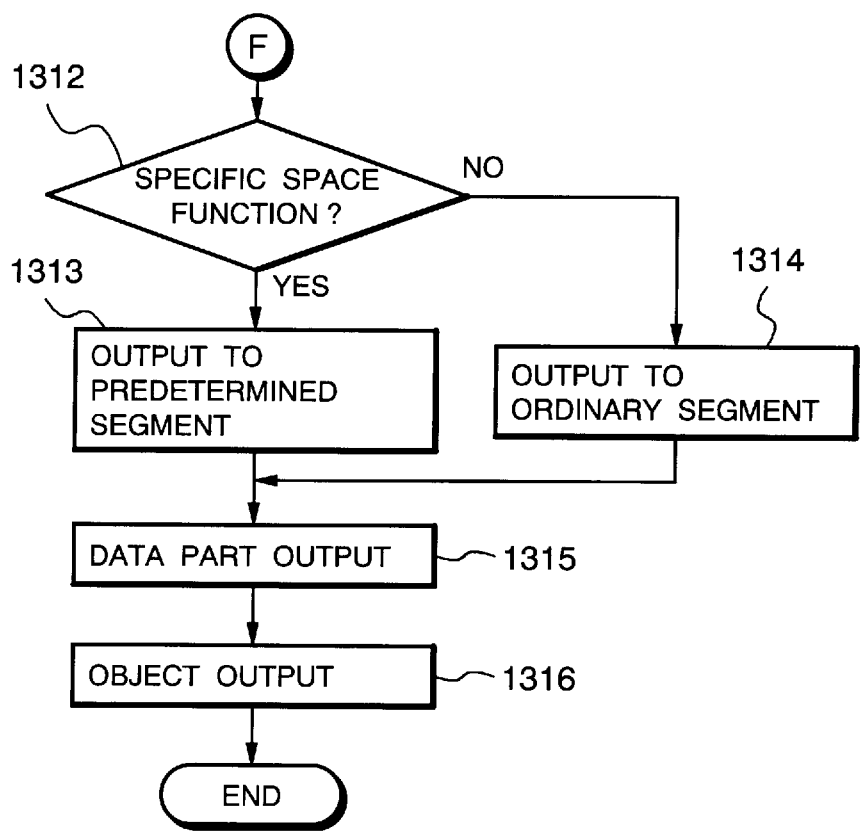
FIG. 14 is a flowchart to show the operation of a conventional language processor illustrating the object module file output operation.

As a result, when the function group shown in FIG. 10 is considered as the subject functions, the minimum function size is 5 byte and satisfies the condition that it is not more than the specific space size. Thus, the processing to designate the specific space function is executed.

FIG. 11 shows the result of the second specific space function designation procedure. As shown in the figure, the function of No. 1 is selected. As a result, the new specific space size can be determined by subtracting the size of function No. 1 (5 bytes) from the specific space size (5 bytes) and is found to be 0. This means that any more function can be placed in the space. According to this embodiment, one more function can be placed in the specific space when compared with the first embodiment above.

With a language processor of this embodiment as described above, if 18 function calls are changed from 3-byte ordinary call instructions to 2-byte exclusive call instructions, for example, four more function calls are changed from ordinary call instructions to exclusive call instructions in addition to those changed to the exclusive call instructions in the first embodiment. When compared with a case where no keyword is specified by the user using a conventional language processor, the object module size is reduced by 22 bytes in this embodiment.

Though the present invention has been explained with referring to preferred embodiments, it is obviously understood that the present invention is not limited to the above embodiments.

As described above, according to the present invention, the optimum functions to be placed in the specific area can be automatically designated without any keyword setting by the user and the size of the generated object module file can be reduced.

At the same time, the program space can be saved and the execution speed of the object module file can be improved.

Besides, by automatic function selection without keyword setting by the user, the optimum combination of functions to be placed in the specific space can be always selected and the smallest possible object module file can be obtained, regardless of the source program scale or the user's skill.

By repeating the selection of functions to be placed in the specific space several times in one compilation, the optimum functions can be selected without repeating the compilation process itself. When compared with the conventional method where several compilation processes are required for optimum function selection for the specific space, the user's work efficiency can be improved.

Further, since there is no need of keyword addition to specify the functions to be placed in the specific space, a good performance object module file can be obtained without modification of the source program when that source program has been used in a different language processing system.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processor which compiles source programs to generate object files with a syntax analysis means to analyze entered source programs, a code generation means to generate instruction codes according to the analysis results and an object file output means to output the generated instruction codes as an object program file, comprising:

a function call counter means for counting the number of calls for each function during syntax analysis by said syntax analysis means;

a function data storage means for storing the call count for each function counted by said function call counter means and the code size of each code for each function generated by said code generation means; and a specific space function designation means for referring to the call count and the code size for each function stored in said function data storage means and for designating the functions to be placed in the specific area held by the microcomputer in the program space so that the total sum of the function code sizes does not become larger than the size of said specific area with placing priority to the functions with many calls.

2. A language processor as set forth in claim 1, wherein said specific space function designation means refers to the code size stored in said function data storage means, selects all combination patterns which can be accommodated in said specific area from all possible function combination patterns, refers to the call count for each function stored in said function data storage means, determines the total function call count for each of said selected combination patterns, and designates the functions in the combination pattern having the largest total function call count as those to be placed in said specific area.

3. A language processor as set forth in claim 1, wherein said specific space function designation means generates a tree structure having functions as nodes by connecting said functions as nodes so that the sum of the code sizes of said functions as nodes arranged on a series of paths is not more than the size of said specific area and selects, from the paths constituting said tree structure, the path having the largest sum of call counts for the functions arranged on it to designate the functions arranged on said path as those to be placed in said specific area.

4. A language processor as set forth in claim 1, wherein said specific space function designation means examines, after designation of functions to be placed in said specific area in the program space, whether there are any more functions which can be placed in the remaining area of said specific area and repeats designation of functions to be placed in said specific area until the time it finds no such function.

5. A language processor as set forth in claim 1, wherein said specific space function designation means determines the remaining area size when the functions designated to be placed in said specific area are placed in the specific area held by said microcomputer in the program space, designates the functions to be placed in said remaining area by the same processing as designation of the functions to be placed in said specific area, and repeats said remaining area size determination and function designation processing until the time it finds no function which can be placed in said specific area.

6. A language processing method which analyzes entered source programs, generates instruction codes according to the analysis results and outputs the generated instruction codes as an object program file, comprising the steps of:

a first step for counting the number of calls for each function during syntax analysis;

a second step for storing the counted number of calls for each function and the code size of each code for each function generated according to said source program analysis results; and a third step for referring to said call count and said code size for each function and for designating the functions to be placed in the specific area held by the microcomputer in the program space so that the total sum of the function code sizes does not become larger than the size of said specific area with placing priority to the functions with many calls.

7. A language processing method as set forth in claim 6, wherein said third step further comprising:

a step for referring to said stored code size and select all combination patterns which can be accommodated in said specific area from all possible function combination patterns;

a step for referring to said stored call count for each function and determine the total function call count for each of said selected combination patterns; and a step for designating the functions in the combination pattern having the largest total function call count as those to be placed in said specific area.

8. A language processing method as set forth in claim 6, wherein said third step further comprising:
   a step for generating a tree structure having functions as nodes by connecting said functions as nodes so that the sum of the code sizes of said functions as nodes arranged on a series of paths is not more than the size of said specific area; and
   a step for selecting, from the paths constituting said tree structure, the path having the largest sum of call counts for the functions arranged on it and for designating the functions arranged on said path as those to be placed in said specific area.

9. A language processing method as set forth in claim 6, wherein said third step further comprising;
   a step for examining, after designation of functions to be placed in said specific area in the program space, whether there are any more functions which can be placed in the remaining area of said specific area;
   wherein said third step repeats designation of functions to be placed in said specific area until the time it finds no function which can be further placed in said specific area.

10. A language processing method as set forth in claim 6, wherein said third step further comprising:
    a step for referring to said stored code size and select all combination patterns which can be accommodated in said specific area from all possible function combination patterns;
    a step for referring to said stored call count for each function and determine the total function call count for each of said selected combination patterns;
    a step for designating the functions in the combination pattern having the largest total function call count as those to be placed in said specific area;
    a step for determining the remaining area size when the functions designated to be placed in said specific area are placed in the specific area held by said microcomputer in the program space; and
    a step for designating the functions to be placed in said remaining area by the same processing as designation of the functions to be placed in said specific area;
    wherein said third step repeats said processing in the above steps until the time it finds no function which can be placed in said specific area.

11. A computer readable memory to store a computer program which analyzes entered source programs, generates instruction codes according to the analysis results and outputs the generated instruction codes as an object program file, said computer program comprising the steps for controlling the computer to:
    a first step for counting the number of calls for each function during syntax analysis;
    a second step for storing the counted number of calls for each function and the code size of each code for each function generated according to said source program analysis results; and
    a third step for referring to said call count and said code size for each function and for designating the functions to be placed in the specific area held by the microcomputer in the program space so that the total sum of the function code sizes does not become larger than the size of said specific area with placing priority to the functions with many calls.

12. A computer readable memory as set forth in claim 11, wherein said third step in said computer program to designate the functions to be placed in the specific area in the program space further comprising:
    a step for referring to said stored code size and select all combination patterns which can be accommodated in said specific area from all possible function combination patterns;
    a step for referring to said stored call count for each function and determine the total function call count for each of said selected combination patterns; and
    a step for designating the functions in the combination pattern having the largest total function call count as those to be placed in said specific area.

13. A computer readable memory as set forth in claim 11, wherein said third step in said computer program to designate the functions to be placed in the specific area in the program space further comprising:
    a step for examining, after designation of functions to be placed in said specific area in the program space, whether there are any more functions which can be placed in the remaining area of said specific area;
    wherein said third step repeats designation of functions to be placed in said specific area until the time it finds no function which can be further placed in said specific area.

* * * * *